US008984732B2

(12) United States Patent
Svensson

(10) Patent No.: US 8,984,732 B2

(45) Date of Patent: Mar. 24, 2015

(54) METHOD FOR ASSEMBLING A STRUCTURE

(75) Inventor: Åke Svensson, Falkenberg (SE)

(73) Assignee: Randek Bautech AB, Falkenberg (SE)

(*) Notice: Subject to any disclaimer, the term of this patent is extended or adjusted under 35 U.S.C. 154(b) by 1022 days.

(21) Appl. No.: 12/998,302

(22) PCT Filed: Oct. 5, 2009

(86) PCT No.: PCT/SE2009/000438

§ 371 (c)(1), (2), (4) Date: Apr. 6, 2011

(87) PCT Pub. No.: WO2010/042004

PCT Pub. Date: Apr. 15, 2010

(65) Prior Publication Data

US 2011/0192496 A1 Aug. 11, 2011

(30) Foreign Application Priority Data

Oct. 7, 2008 (SE) ........................................ 0802105

(51) Int. Cl.

*B23Q 17/00* (2006.01)
*B27M 1/00* (2006.01)
*B27F 7/15* (2006.01)
*E04C 3/17* (2006.01)

(52) U.S. Cl.

CPC .. *B27F 7/155* (2013.01); *E04C 3/17* (2013.01)
USPC ........................................ 29/407.04; 144/344

(58) Field of Classification Search

USPC ......... 29/897.31, 897.3, 897, 407.04, 405.05, 29/407.09, 407.01, 428, 720; 144/344; 382/141

See application file for complete search history.

(56) References Cited

U.S. PATENT DOCUMENTS

| | | | | |
|---|---|---|---|---|
| 5,873,567 | A | 2/1999 | Williams | |
| 8,131,008 | B2 * | 3/2012 | Thompson et al. | 382/100 |
| 8,178,371 | B2 * | 5/2012 | Hellstrom et al. | 438/26 |

FOREIGN PATENT DOCUMENTS

| | | | |
|---|---|---|---|
| DE | 195 11 827 | C1 | 4/1996 |
| GB | 2 272 618 | A | 5/1994 |

* cited by examiner

*Primary Examiner* — John C Hong

(74) *Attorney, Agent, or Firm* — McGinn IP Law Group, PLLC

(57) ABSTRACT

A method of assembling a structure of timber lengths, e.g. roof trusses, includes a number of upper and lower structure lengths or pieces, as well as a number of diagonals or braces etc., in which the timber lengths are laid out and fixed to one another. The structure formed from the timber lengths fixed to one another is observed by a first camera for positional determination of the structure and comparison of observation data with structure data and for controlling at least a second camera. The structure is fed into a unit for pressing in place of jointing pieces, e.g. corrugated fasteners, over the joints between the timber lengths by at least one positionable press unit, and the second camera observes the infed structure and positions the press unit at the correct position over a joint for pressing in place of a jointing piece.

12 Claims, 3 Drawing Sheets

METHOD FOR ASSEMBLING A STRUCTURE

The present invention relates to a method according to the preamble to appended claim 1.

BACKGROUND OF THE INVENTION

Within the industry for the manufacture of timber houses, e.g. prefabricated houses, and houses constructed from both wood and other materials, it is of major importance to be able to assemble structures, e.g. roof trusses, in as rapid and rational a manner as possible without jeopardising accuracy and reliability. It is further of importance that the positioning of the timber lengths which are included in the structure and which are cut and otherwise treated beforehand may be carried out rapidly and simply without any major risk of incorrect positioning. The laid-out timber lengths are fixed provisionally to one another by means of, for example, corrugated fasteners with the aid of a nail pistol or the like in order to make possible movement of the structure for the final fixing together of the timber lengths to one another at each joint by means of so-called corrugated fasteners which can be adapted to the different joints between the timber lengths. Thus, there is a major need in the art for an apparatus for rational handling of the corrugated fasteners and pressing of the correct corrugated fastener over the joint intended therefore. In recent years, it has proved that there is a further need for automation of the assembly procedure or interconnection (the nailing operation) of roof trusses. It is further desirable to be able rapidly and automatically to adapt equipment to suit different types of roof trusses. This implies that it is desirable to reduce and preferably eliminate the necessary downtimes or waiting times.

SUMMARY OF THE INVENTION

The task forming the basis of the present invention is to satisfy the above-outlined needs and wishes.

This task is solved according to the present invention in the method disclosed by way of introduction in that the method has been given the characterising features as set forth in appended claim 1.

The present invention realises a method and an apparatus for rational and particularly rapid and efficient assembling (nailing) of such structures as roof trusses and the like. The method according to the present invention makes for an extremely high level of automation without jeopardising accuracy and other quality standards. Moreover, the method according to the present invention makes for the handling of structures of different types in one and the same apparatus or line, substantially without the need for any change over or switching time between structures of different, widely varying configurations and types in, in principle, any sequence whatever.

BRIEF DESCRIPTION OF THE DRAWINGS

The present invention will now be described in greater detail hereinbelow, with reference to the accompanying Drawings.

DETAILED DESCRIPTION OF THE INVENTION

A method according to one embodiment of the present invention will now be described in greater detail hereinbelow, in connection with the assembly (nailing) of a number of different types of roof trusses and with reference to the apparatus or the line exemplified on the accompanying Drawings.

Figure 1C:
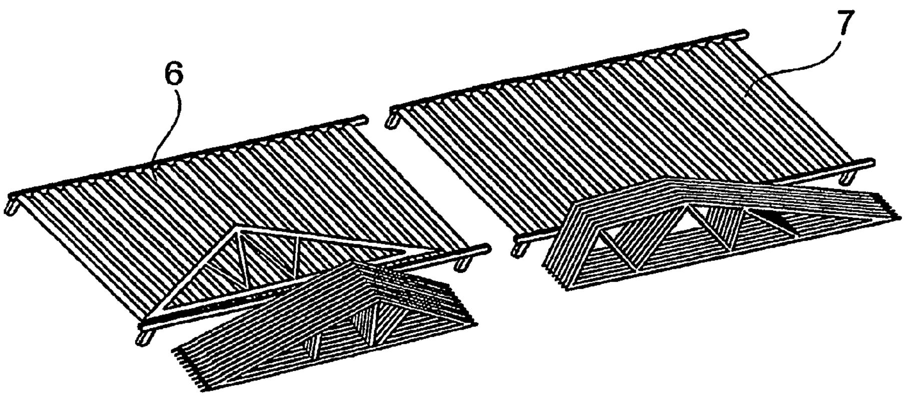
FIGS. 1A-1B are schematic perspective views of an apparatus or line for assembling structures in the form of roof trusses, for carrying the method according to the present invention into effect.
Figure 1B:
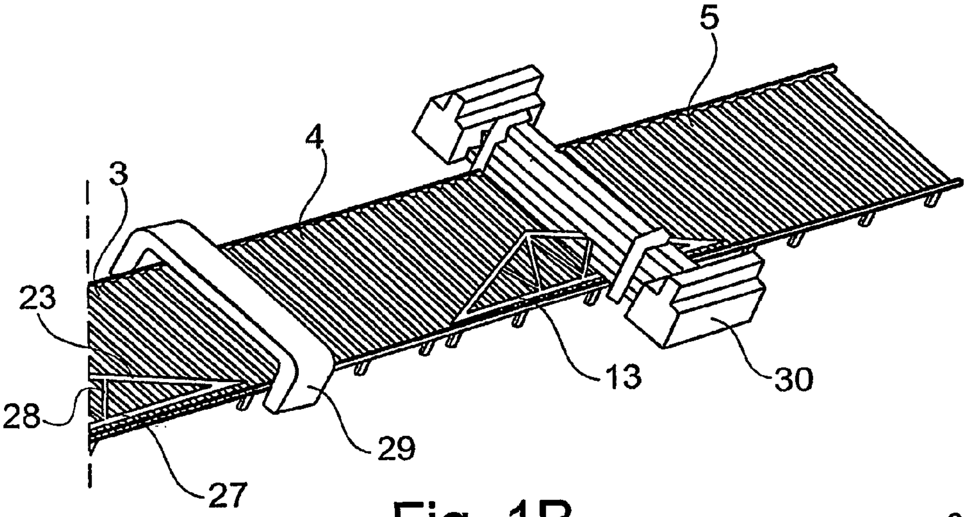
Figure 1A:
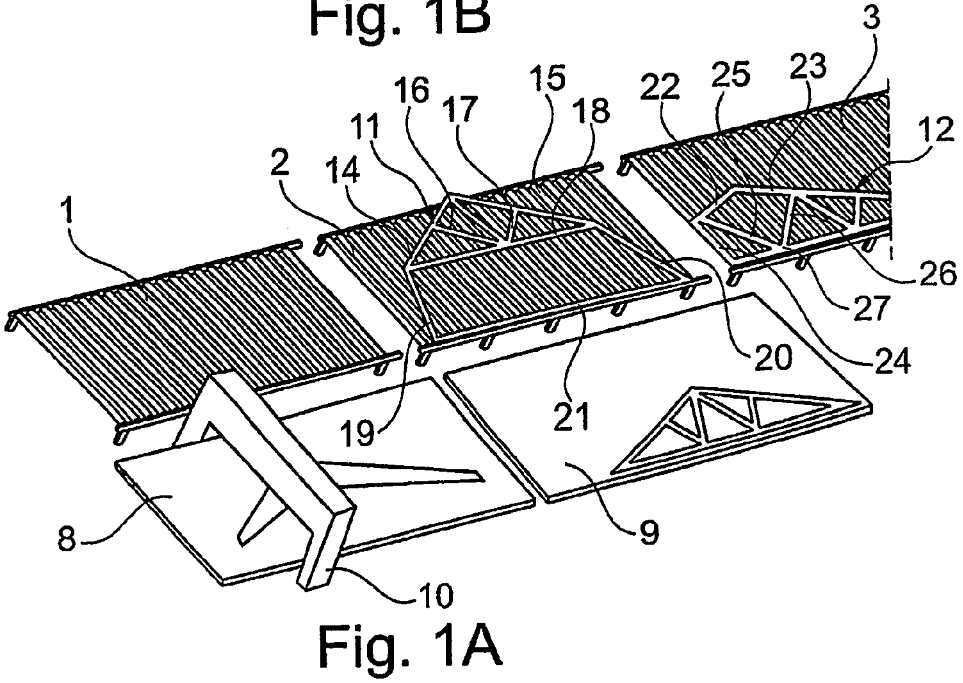

In FIGS. 1A-1C is exemplified the manufacture or assembly (nailing) of a number of different types of roof trusses. The apparatus in FIGS. 1A-1C may be combined with the parts in FIG. 1A in line with the parts in FIG. 1B and finally with the parts in FIGS. 1A and 1B in line with the parts in FIG. 1C, this latter part having been cut off for technical drawing reasons.

The apparatus or the line in FIGS. 1A-1C comprises a number of roller conveyors 1-7 which, in the present embodiment, comprise servo-driven super- and/or subjacent rubber rollers. Beside the roller conveyors 1 and 2 are positioned two assembly tables 8 and 9 which may be so-called puck tables with automatically adjustable abutments or pucks. The adjustment of the abutments or pucks is carried out using computer processed drawing material as the point of departure.

The timber lengths are laid up in the proximity of the assembly tables 8 and 9 on pallets or the like and are marked in a suitable manner for the roof truss in question which is to be laid up on the assembly table 8 or the assembly table 9. One roof truss is exemplified on the assembly table 8, and another roof truss is exemplified on assembly table 9. For rational handling, assembly may take place on the one table, while the timber lengths laid up on the other table are fixed to one another by means of, for example, corrugated fasteners or undulating plates in a per se known manner.

According to the present invention, the positioning and fixing of the corrugated fasteners take place with the aid of a nailing gantry 10 which includes a number of mutually displaceable nailing heads with corrugated fastener magazines and which are displaceable along, and thereby over, the assembly tables 8 and 9. The displacement of the nailing heads and the gantry 10 takes place automatically, using computer processed drawing material as the point of departure. The gantry 10 and its nailing heads may be considered to be CAD guided to the joints and intersections which are to be provided with corrugated fasteners or undulating plates.

After the fixing of the timber lengths to one another on the assembly tables 8 and 9 to a provisionally assembled, and thereby as yet unfinished, or ready-nailed roof truss, e.g. the roof truss 11 on the roller conveyor 2, the roof truss 12 on the roller conveyor 3 and the roof truss 13 on the roller conveyor 4. The roof trusses 11, 12, 13 have been transferred from the assembly table 8 or 9 with the aid of lifting means for further transport on the roller conveyors 1, 2, 3 or 4. The roof truss 11 on the roller conveyor 2 is composed of two upper frame lengths 14 and 15, two diagonals 16 and 17, a centre piece 18, two side pieces 19 and 20, as well as a bottom piece 21, while the roof truss 12 on the roller conveyor 3 is composed of two upper pieces 22 and 23, a side piece 24, a number of diagonals 25 and 26, a lower piece 27 and a further diagonal 28 (FIG. 1B).

Thus, the method according to the present invention permits different types of roof trusses 11, 12, 13 to follow after one another on the roller conveyors 1, 2, 3, 4 and further on the roller conveyors 5, 6, 7 without the need for any manual switching or adjustment of the roof truss line, which implies that everything takes place automatically, with the aid of computer processed drawing material or by CAD control. The only manual interventions take place at the assembly tables 8 and 9 where one or more operators place out the timber lengths with the aid of the automatically adjusted and set abutments or the pucks in the tables.

Figure 3:
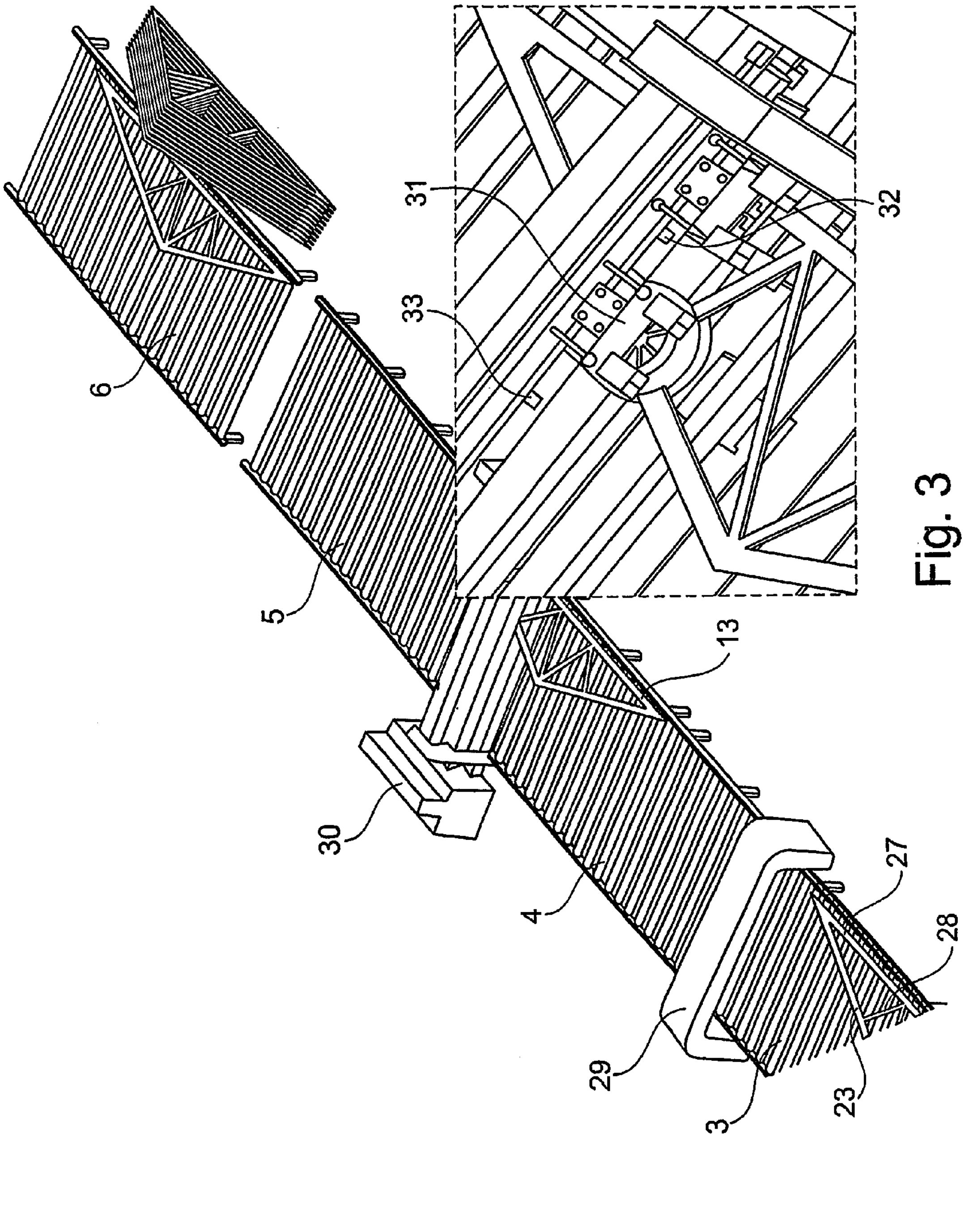
FIG. 3 is a view, on a larger scale, of the part of the apparatus illustrated in FIG. 1B, as well as an inset view on an even larger scale of a part of a press unit included in the apparatus.

Between the roller conveyor 3 and the roller conveyor 4, there is disposed a gantry 29 with a camera of the vision system type for observing or photographing the passing roof trusses and identifying them with the aid of a reference based on computer processed drawing material, e.g. a CAD file. With the aid of the camera system in the gantry 29, information or data is also retrieved for nominal positional determination of that roof truss which is advanced further on the roller conveyor 4 up to a gantry 30 which includes a number of press units, of which one press unit 31 is shown on a larger scale in FIG. 3. The press units 31 are each provided with two cameras 32 and 33 which are also of the vision system type. The one camera 32 is mounted offset in the y-axis. The cameras 32 and 33 monitor the exact position for pressing of a corrugated fastener in position over the joint or intersection point in question on the roof truss.

The gantry 30 with the press units 31 may be of the type which is described in Swedish Patent Specification 0601495-5/530069, modified in a suitable manner with the cameras 32 and 33, and with the aid of drivable control means for adjusting the press tool carriages included.

The roof truss finished with corrugated fasteners is advanced further via the roller conveyor 5 to the roller conveyors 6 or 7 for each type of roof truss, of which the one roller conveyor 6 is intended for one type of roof truss and the other roller conveyor 7 is intended for another type of roof truss, and which are equipped with driven discharge means and paths with stackers for separate roof truss packages. It is possible to have additional discharge roller conveyors for further roof truss types.

The camera gantry 29 need not be positioned between the roller conveyors 3 and 4, but may, for example, be placed in over the roller conveyor 4. A roof truss may be positioned both under the camera gantry 29 and partly in the press unit gantry 30, where handling of roof trusses longer than the distance between the gantry 29 and 30 is permitted.

Figure 2:
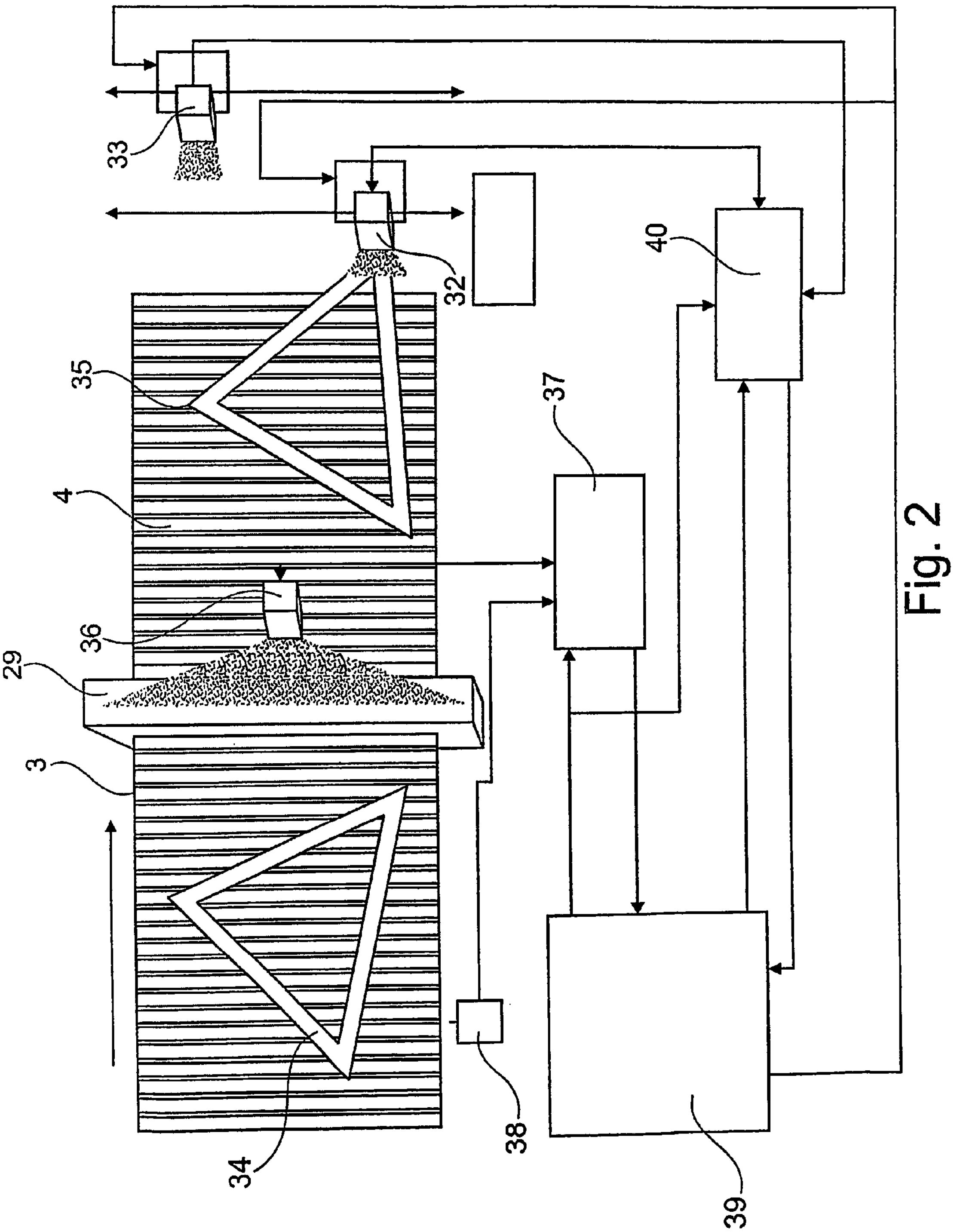
FIG. 2 is a block diagram of one embodiment of the method according to the present invention.

With reference to the block diagram illustrated in FIG. 2, parts of the method according to the present invention will now be illustrated in greater detail. The roller conveyor 3 on the one side of the gantry 29 supports a structure 34, and the roller conveyor 4 on the other side of the gantry 29 supports a structure 35 which has been fed through the gantry 29 and observed by means of a camera 36 therein. The camera 36 is suitably a line scan camera which is rehearsed, in relation to computer processed drawing material, e.g. CAD data, to identify and positionally determine the structure 35. Information from the camera 36 is fed to a computer or processor 37 which is connected to a pulse emitter 38 and to a system unit 39 of the master type. The system unit 39 feeds information about roof truss type to the processor 37 and to an additional computer or processor 40 which is also connected to the cameras 32 and 33 which are also connected to the system unit 39. The processor 37 receives information from the system unit 39 about the incoming roof truss type and feeds back to the system unit 39 the position of the roof truss. The processor 40 also receives information from the system unit 39 concerning incoming roof truss type. The system unit 39 is further connected to the cameras 32 and 33 for setting thereof to nominal detail positions while information fed back to the processor 40 from the cameras 32 and 33 causes the processor 40 to transfer to the system unit 39 information on the assumed detail position and the next detail position.

The same reference numerals are employed in the different Drawing Figures.

Many modifications are naturally conceivable without departing from the scope of the inventive concept as defined in the appended Claims.

The invention claimed is:

1. A method of assembling a structure of timber lengths, comprising a number of upper and lower structure lengths or pieces, as well as a number of diagonals wherein the timber lengths are laid out and fixed to one another, the structure formed from the timber lengths fixed to one another is observed by a first camera for positional determination of the structure and comparison of observation data with structure data and for controlling at least a second camera, the structure is fed into a unit for pressing in place of jointing pieces, over the joints between the timber lengths by at least one positionable press unit, and the second camera observes the infed structure and positions the press unit at a correct position over a joint for pressing in place of a jointing piece.

2. The method as claimed in claim 1, wherein the timber lengths are laid out on a substrate, and a fixing gantry is moved over the laid-out timber lengths for placing of at least one fixing piece in the joint between the timber lengths.

3. The method as claimed in claim 2, wherein the timber lengths are laid out on the substrate in accordance with structure data fed to the fixing gantry which sets or adjusts a number of positioning means for facilitating positioning of the timber lengths in the correct position.

4. The method as claimed in claim 2, wherein the fixing gantry includes a number of positionable units with access to magazines for the fixing pieces, for placing of at least one fixing piece in the joints between the timber lengths.

5. The method of claim 4, wherein said at least one fixing piece comprises one of a corrugated fastener and undulating plate.

6. The method of claim 3, wherein the substrate comprises a puck table.

7. The method as claimed in claim 1, wherein the structure formed from the timber lengths fixed to one another is displaced to and past the first camera for observation and identification of the structure with the aid of stored data, and feeding of positional data to the second camera for positioning of the second camera in a nominal position for observation of each one of the joints to the proximity of the camera and for feeding observation data to a unit for comparison of observation data with exact data and feeding of positioning data to the second camera for fine positioning thereof and thereby fine positioning of the press unit to the correct position for placing the jointing piece over the joint between the timber lengths.

8. The method as claimed in claim 1, wherein data from the first camera is fed to two cameras for positioning of the press unit, and the second cameras observe the same joint between the timber lengths, and observation data from the two second cameras is compared with exact data for fine positioning of the press unit which, in the correct fine position, presses in place a jointing piece over the joint between the timber lengths.

9. The method as claimed in claim 1, wherein observation data from a structure observed by the first camera is fed via a first processor to a system unit with stored data concerning different structures for identifying the observed structure and positional determination of the structure, and identification- and positional data are fed to a second processor for positional determination of the second camera or cameras.

10. The method as claimed in claim 9, wherein observation data from the second camera or cameras is fed to the second processor for fine positioning of the second camera or cameras and thereby the press unit.

11. The method of claim 1, wherein said timber lengths comprise roof trusses.

12. The method of claim 1, where said jointing pieces comprise corrugated fasteners.

* * * * *